No. 12,626. REISSUED APR. 2, 1907.

L. P. NORMANDIN.

SUPPORTING STAND AND MOLD FOR MAKING BUILDING BLOCKS.

APPLICATION FILED MAY 31, 1905.

2 SHEETS—SHEET 1.

Witnesses
Geo. W. Graves
Edward D. Ault

Inventor
Levi P. Normandin
By James Whittemore
Atty.

No. 12,626. REISSUED APR. 2, 1907.
L. P. NORMANDIN.
SUPPORTING STAND AND MOLD FOR MAKING BUILDING BLOCKS.
APPLICATION FILED MAY 31, 1905.
2 SHEETS—SHEET 2.
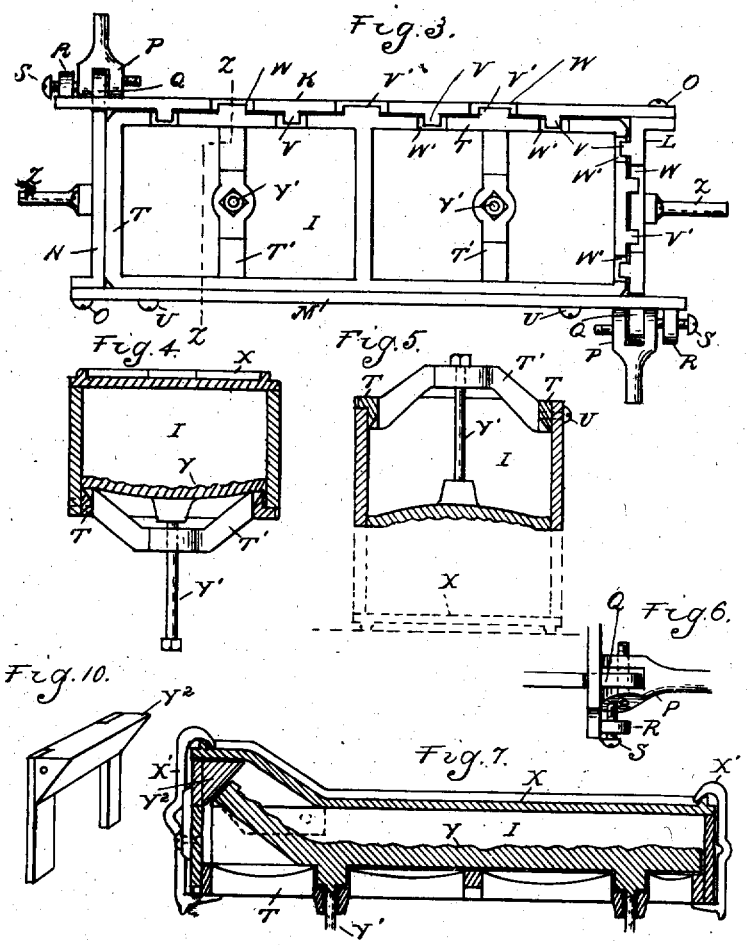
Witnesses:
Geo. H. Graves
Edward D. Ault
Inventor:
Levi P. Normandin
By James Whittemore
Atty.

UNITED STATES PATENT OFFICE.

LEVI P. NORMANDIN, OF JACKSON, MICHIGAN, ASSIGNOR TO WILLIAM F. COWHAM, OF JACKSON, MICHIGAN.

SUPPORTING-STAND AND MOLD FOR MAKING BUILDING-BLOCKS.

No. 12,626. Specification of Reissued Letters Patent. Reissued April 2, 1907.

Original No. 729,887, dated June 2, 1903. Application for reissue filed May 31, 1905. Serial No. 263,192.

*To all whom it may concern:*

Be it known that I, LEVI P. NORMANDIN, a citizen of the United States of America, residing at Jackson, in the county of Jackson and State of Michigan, have invented certain new and useful Improvements in Supporting-Stands and Molds for Making Building-Blocks, of which the following is a specification, reference being had therein to the accompanying drawings.

This invention relates to molds for making building-blocks of cement, concrete, &c.; and it consists in providing a mold with a movable bottom and sides and ends, which may be loosened to free the building-block when in its plastic state.

The invention further consists in providing a work stand or bench therefor and means for supporting the cores in molding hollow building-blocks and in the means for drawing the cores from the molds, and consists, further, in the peculiar construction, arrangement, and combination of parts, all as more fully hereinafter described, and shown in the accompanying drawings, in which—

Figure 1:
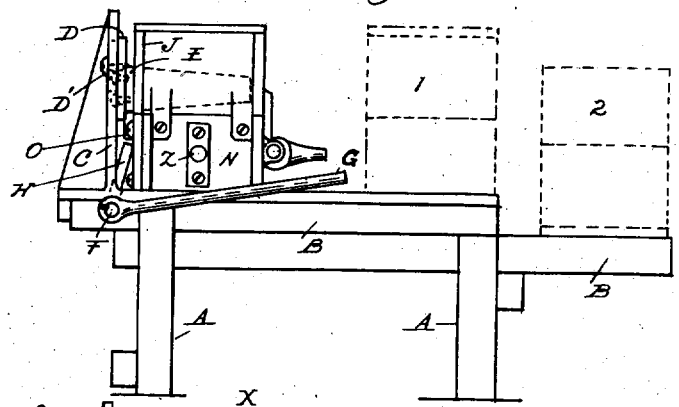
Figure 8:
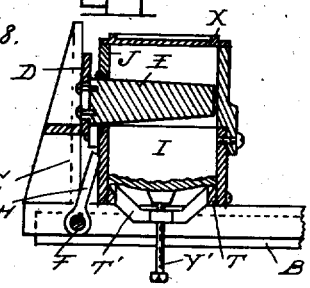
Figure 9:
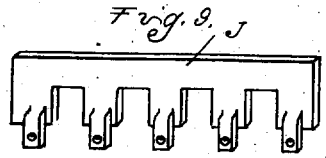
Figure 2:
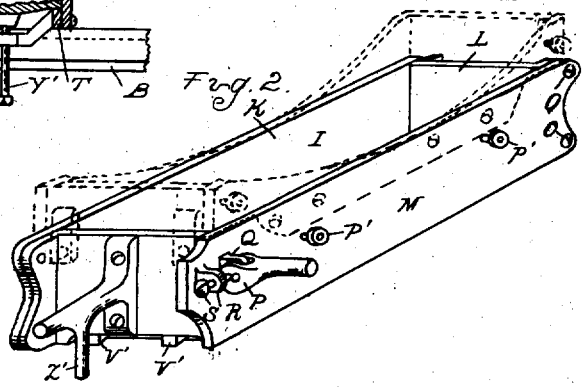

Figure 1 is a side elevation of the supporting-stand, mold, cores of the mold, and means for forcing the mold from the cores. Fig. 2 is a perspective view of the mold, showing in dotted lines the detachable side and end extensions for molding curved blocks. Fig. 3 is a bottom plan view of the mold; Fig. 4, a section on the line *z z*, Fig. 5, a similar section showing method of emptying mold; Fig. 6, a plan view of the double cam for clamping the mold together; Fig. 7, a vertical section through a mold complete for hexagonal or octagonal blocks. Fig. 8 is a section through the mold, core, and supporting-stand; Fig. 9, a side elevation of the cut-out extension used to permit the insertion of the cores in molding hollow blocks; Fig. 10, a perspective view of one of the wedge-blocks for squaring the end of a mold when curved or hexagonal blocks are made.

As shown in the drawings, the supporting-stand or work-bench is adapted to be moved where the building is to be put up and comprises the four corner-posts A, horizontal members B, and end uprights C, (provided with vertical slots,) to which the transverse bar D, carrying the tapering cores E, is vertically adjustably secured by screws D′, these being only used in molding hollow blocks, each core being adjustably secured on the bar D to permit of their adjustment to correspond with the form of the block.

F is a transverse shaft provided with a lever-handle G and arms H for forcing the mold I from the cores when the block is made, the extension side wall J of the mold being cut out at intervals for the cores, as shown in Fig. 9.

The mold I consists of two members, one comprising the side and the end wall K L and the other the side and end M N, the walls of each member being rigidly secured together at diametrically-opposing corners of the mold by the screws O and the members adjustably secured together at the other corners of the mold by the double-acting cams P, pivotally mounted on the ears Q, extending through apertures in the side of the mold, and R represents ears integrally formed with the side of the casing and provided with an adjusting-screw S, forming a variable stop acting against the inclined side of the cam P, so that when the cam is depressed it will tend to force the ends of the mold together, as well as the sides, and vice versa, in releasing the mold to free the block.

T is an annular ledge or shoulder forming an abutment all around the inside lower edge of the mold and rigidly secured to the side and end M N of the mold by screws U and at its opposite side K, and end L is provided with lugs and notches V W, coöperating with lugs and notches V′ W′ in the side and end of the mold, so that the side and end walls K L will have a limited play or lost motion when the cams are released to free the block. The annular ledge T is beveled off at the top, as shown in Figs. 4 and 7, to prevent any material from lodging thereon.

T′ represents arched transverse connecting-bars integrally formed with the ledge T.

X is the removable top of the mold, adapted to be held in place by the dogs or clamps X′, and Y is the movable bottom, provided on its face with the configuration of the ordinary building-stone and on its under side with guide-pins Y′, passing through apertures in the bars T′, said pins being provided with adjustable stops or nuts at their ends.

Z represents handles at the opposite ends of the mold for lifting the same, and Z′ are handles at right angles for turning the same.

In Fig. 2 I have shown curved detachable extensions to be used in molding curved blocks, in which case a bottom and top curved to the corresponding arc is substituted in place of the straight ones.

In Fig. 7 I have shown a mold for molding obtuse-angled blocks for bay-windows, &c., found necessary to be extended up, and a wedge-block $Y^2$ is provided, as shown in Fig. 10, to make a square corner for the joint, a similar block being used at each end of the curved block, and where the end of a square block is exposed the end of the block may be finished by inserting a plate of the desired configuration in the end of the mold, which can be removed after the block is discharged from the mold.

Where the molds are excessively high in molding large blocks, I may use another set of cams above the first to prevent the sides from springing, and instead of using the extension-pieces I may form them integral with the sides and ends.

In molding veneer blocks I also provide adjusting-screws P′ in the sides of the mold for making countersinks in the block for the heads of the holding-nails to lie in, similar screws also being used to hold the wedge-blocks in place, as shown in Fig. 2.

Having thus fully described the device, it is intended to operate as follows: The mold is placed on the members B, as shown in dotted lines in Fig. 1, position 1, and the material tamped in the cover is then put in place and the clamping-dogs X′ to hold the same in place while being turned bottom side up. The operators, one at each end, then lift the mold by the handles Z and turn it by the handles Z′ upside down into the position 2, Fig. 1, when the clamping-dogs are removed, the double-acting cams P released, and the side and end walls of the mold freed from contact with the block. The mold is then carefully lifted, and, as the bottom is loose, it follows the block out of the mold, thus insuring a clear-cut sharp edge, as shown in Fig. 5.

Having thus fully described my invention, what I claim is—

1. A mold consisting of two members each forming a side and an end wall of the mold and having a limited movement relative to the other, an annular abutment secured to one of said members, and a movable bottom supported by said abutment.

2. A mold consisting of two members movable relatively to each other and forming the walls of the mold, an annular abutment secured to one of said members near the lower side of the wall and provided with transverse bars having openings, a movable bottom, and guide-pins on said bottom to engage the openings in said bars.

3. A mold consisting of two members each forming a side and an end wall of the mold, said side walls being each formed with an aperture, ears on the end walls to project through said apertures, and cams pivotally secured to said ears to engage the side walls.

4. A mold formed of two members each consisting of a side and an end wall secured together to form a corner of the mold and each formed with an aperture, an ear on each side wall adjacent to said apertures, an ear on each end wall to project through said apertures, adjustable stops on the ears on the side walls, and cams pivotally secured to said ears on the end walls and having cam-faces to engage the stops and the side walls.

5. A mold consisting of two members each forming a side and an end wall of the mold and one of said members formed with notches at its lower edge, means for uniting said members, an annular abutment secured at one side to one of said members and at its opposite side is provided with lugs to engage the notches in the other member, and a movable bottom supported by said abutment.

6. A mold consisting of two members each forming a side and an end wall of the mold and one of said members being provided with notches in the lower edge of its walls, inwardly-extending lugs on the member having the notched edge, an annular abutment secured at one side to one of the members provided with notches at its opposite side to receive the lugs on the other member, lugs on the abutment to loosely engage the notches in the adjacent member, arched cross-bars connecting the sides of the annular abutment and having openings, a movable bottom supported by said abutment, guide-pins on said bottom extending through said openings in the cross-bars, stops on the outer ends of said pins, and means for loosely connecting the said members and for clamping the same together.

7. A mold having side and end walls secured together at two opposite corners of the mold and forming two members, means for uniting said members at the other corners of the mold, side extensions curved at their upper sides and detachably secured to the side walls of the mold, end extensions detachably secured to the end walls of the mold, a curved movable bottom, and a wedge-block to form the end of the molded article.

8. In a machine for molding building-blocks, the combination with a supporting-stand; of uprights near one end of said stand, a mold having openings in its side wall adjacent to said uprights, a series of core-blocks adjustably secured to the uprights and adapted to project into the mold through said openings, a rock-shaft journaled in bearings on the stand, arms on said rock-shaft to engage the mold to move the same to withdraw the cores from the mold, and a lever on the rock-shaft to operate the same.

9. In a machine for molding building-blocks, the combination with a supporting-stand; of uprights on said stand provided with slots, a cross-bar provided with slots, bolts passing through the slots in the uprights to adjustably secure the cross-bar thereto, tapering core-blocks adjustably secured to said cross-bar by bolts passing through the slots in said bar, a mold supported by the stand adjacent to the uprights and beneath the core-blocks, side and end extensions detachably secured to the walls of said mold, one of said side extensions being formed with openings through which the core-blocks project, and means for moving the mold to withdraw the core-blocks.

10. In a machine for molding blocks, a mold comprising a side for molding the face of the block, an apertured side at an angle to the face-molding side, and a third side, which is removable, a stand upon which said mold is initially supported with its face-molding side down, a core mounted on said stand to project laterally in registration with the aperture of said apertured side and relatively movable to said mold for insertion and withdrawal through said aperture, and means for turning said mold to bring the removable side down whereby the molded block may be removed thereon.

11. In a machine for molding blocks, a mold comprising a face-molding side, an apertured side at an angle thereto, and a third side, which is removable, a stand on which said mold is initially supported with said face-molding side down, a core mounted on said stand projecting laterally in registration with the aperture of said apertured side and relatively movable in relation to the mold for insertion and withdrawal through said aperture, means for turning the mold to bring the removable side down, and a portion of said stand upon which said mold is supported after turning.

In testimony whereof I hereby sign this application, in the presence of two witnesses, at Jackson, Michigan, May 29, A. D. 1905.

LEVI P. NORMANDIN.

Witnesses:

SIDNEY L. WILTSE,
DANIEL H. PERRY.